UNITED STATES PATENT OFFICE.

FREDRICK M. HIBBARD, OF GOSHEN, INDIANA, ASSIGNOR OF ONE-HALF TO WILLIAM B. LEHMAN, OF SAME PLACE.

ASBESTUS ROOF PAINT OR COMPOSITION.

SPECIFICATION forming part of Letters Patent No. 249,239, dated November 8, 1881.

Application filed September 12, 1881. (No specimens.)

*To all whom it may concern:*

Be it known that I, FREDRICK M. HIBBARD, a citizen of the United States of America, residing at Goshen, in the county of Elkhart and State of Indiana, have invented certain new and useful Improvements in Asbestus Roof-Paints; and I do hereby declare the following to be a full, clear, and exact description of the invention, such as will enable others skilled in the art to which it appertains to make and use the same.

The object of my invention is to produce a paint which shall be fire and water proof, and which shall be easy to prepare for use, easily applied, and when applied to hold tenaciously to wood, iron, or slate, and successfully withstand the disturbing influence of changes in temperature and the wearing of exposure to the elements.

The composition consists of the following ingredients in about the proportions stated, viz: asbestus, fifteen pounds; litharge, five pounds; gypsum, ten pounds; coal-tar, forty gallons. These to be mixed cold. The asbestus renders the paint fire-proof, the litharge adds toughness and elasticity to the paint, and the gypsum adds body, and the whole constitutes an article of superior merit, as proved by actual experimental and rigid tests.

I do not wish to be understood as limiting myself to the exact proportions herein stated, as they may be varied within certain limits without departing from the spirit of my invention; and I deem it proper to state that I do not broadly claim the use of any one of the above-named ingredients—as, for instance, the gypsum, as that has heretofore been used as an ingredient of paints and colors; and in like manner I disclaim the use of asbestus broadly as a component of paint, as I am well aware that its fire-proof characteristic has been taken advantage of in many fire-proof compounds.

I am also aware that asbestus and bitumen have been used for roof-paint; but these require heat in compounding the mixture, and they require heat to liquefy the cooled solid compound for use, or for thinning with naphtha, or its equivalent, and I do not claim such as of my invention; but What I do claim as new, and desire to secure by Letters Patent, is—

As an article of manufacture, an asbestus roof-paint comprising asbestus, litharge, gypsum, and coal-tar in substantially the proportions herein given.

In testimony whereof I have affixed my signature in presence of two witnesses.

FREDRICK M. HIBBARD.

Witnesses:
A. S. ZOOK,
D. W. NEIDIG.